United States Patent [19]

Osborn

[11] 3,969,307

[45] July 13, 1976

[54] MOLDING OF POLY(ARYLENE SULFIDE) RESINS

[75] Inventor: Charles W. Osborn, Bartlesville, Okla.

[73] Assignee: Phillips Petroleum Company, Bartlesville, Okla.

[22] Filed: Mar. 14, 1975

[21] Appl. No.: 558,257

[52] U.S. Cl. .............................. 260/37 R; 260/79; 260/79.1; 264/211; 264/232; 264/235; 264/331; 264/346
[51] Int. Cl.² .................. C08G 23/00; C08G 51/04
[58] Field of Search .......... 264/331, 235, 346, 232, 264/211, 176 R, 328; 260/79, 79.1

[56] References Cited
UNITED STATES PATENTS

| 3,562,199 | 2/1971 | Hill, Jr. et al. | 264/235 |
| 3,595,952 | 7/1971 | Boyer et al. | 264/235 |

Primary Examiner—Jeffery R. Thurlow

[57] ABSTRACT

The discoloration of molded articles made from poly(arylene sulfide) resins is minimized or prevented by treating the molded article with water at an elevated temperature.

7 Claims, No Drawings

MOLDING OF POLY(ARYLENE SULFIDE) RESINS

It is known that poly(arylene sulfide) resins tend to darken when cured at elevated temperatures. While this darkening does not affect the physical properties, it does affect the appearance of a molded article. Pigments incorporated in the resin also tend to lose their brilliance so that articles of desired color are not obtained. One solution to this problem is to incorporate certain additives into the resin, such as disclosed in U.S. Pat. Nos. 3,386,950; 3,408,342 and 3,658,753, for example. In accordance with this invention, it has been found that the discoloration of molded articles formed from poly(arylene sulfide) resins can be substantially reduced by treating the molded article with water at an elevated temperature. The water can be in the form of steam. This procedure eliminates the use of additives which may adversely affect the properties of the polymer for certain applications. The invention is particularly useful in forming articles of pigmented resin.

The poly(arylene sulfide) resins which are employed in this invention can be prepared by the processes described in U.S. Pat. No. 3,354,129, for example. As disclosed in the patent, these polymers can be prepared by contacting a polyhalo-substituted cyclic compound containing unsaturation between adjacent ring atoms and an alkali metal sulfide in the presence of a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit -R-S- where R is phenylene, biphenylene, naphthylene, biphenylene ether or a lower alkyl-substituted derivative thereof. By "lower alkyl" is meant alkyl groups having 1 to 6 carbon atoms such as methyl, propyl, isobutyl, n-hexyl, and the like.

The polymers employed in this invention are preferably those which have melting temperatures above about 204° C. These arylene sulfide polymers can have a melting temperature anywhere in the range from 204° C. to 482° C. Polymers of phenylene sulfide normally have melting temperatures in the range from about 288° to 482° C. The preferred polymers have an inherent viscosity in chloronaphthalene at 206° C. of at least 0.1, more preferably between 0.1 and 0.3 and ideally between 0.13 and 0.23.

The invention is broadly applicable to the use of poly(arylene sulfides) formed by any technique. Such polymers can be manufactured as described in U.S. Pat. No. 2,513,188 by reacting mixtures of p-dichlorobenzene and 1,2,4-trichlorobenzene with sulfur and a metal halide at fusion temperatures. The polymers can also be manufactured by the method described in British Pat. No. 962,941 wherein metal salts of halothiophenols are heated at a polymerizing temperature. The invention is applicable to the use of linear polymers formed from dihalo aromatic compounds or with cross-linked polymers wherein polyhalo aromatic compounds are added to the polymer to aid cross-linking.

A typical poly(phenylene sulfide) resin employed in this invention has a melt flow above 2500 g in 10 min., as measured by ASTM D-1238-70 at 316° C. under a 5 kg load. The resin commonly is precured at a temperature of about 316° C. for 2 to 6 hours, or until it has a melt flow of generally less than 50 g/10 min. The resin is thereafter molded at a mold temperature of less than about 200° F. (93.3° C.). The resin which was employed in the examples which follow was precured to a melt flow of about 25 g/10 min.

In accordance with this invention, the molded article is treated with water at a temperature generally above about 180° F. (82.2° C.) for a period of time ranging from about twenty minutes to 96 hours, or longer. In general, a shorter treating time can be employed when the water is at a higher temperature, such as the boiling point. In addition, the water can be used in the form of steam, so the term "water" as used herein is intended to mean water in the liquid phase or as steam.

The pigments which can be employed in accordance with this invention are those which are thermally stable at the curing temperature of the resin and the temperature at which the molded article is to be utilized. Representative heat stable pigments include iron oxide, titanium oxide, chrome green, chrome yellow, cadmium yellow, phthalocyanine pigments, cadmium orange and the like. The concentration of pigments will vary widely depending on the amount of pigment desired in the final product. Typical amounts of pigments employed generally range from about 0.5 to 12 weight percent based on the resin.

In addition to pigments, it is common practice to incorporate fillers and reinforcing agents into the polymer such as glass fibers, asbestos fibers, carbon black, titanium dioxide and the like. Processing aids, such as polytetrafluoroethylene, may also be included.

The following examples demonstrate the invention.

EXAMPLE I

An injection molding grade poly(phenylene sulfide) resin, melt flow of 25 g/10 minutes [ASTM D-1238-70, operating at 316° C. (600° F.) and 5 kg weight], containing 40% glass fibers was used in these tests.

Five weight percent of pigment based on total resin plus glass was used. Test bar samples containing red iron oxide pigment and phthalocyanine blue were injection molded at 600° F. (315.6° C.) stock temperature, 50° F. (10° C.) mold temperature and injection pressure of 18,000 psi.

One test bar of each color was placed in a container of water which was held at 190° F. (87.8° C.) for 4 days.

At the end of that time, a visual comparison was made with untreated test bars. The test bars which had been in the water had a much lighter color than the originals. The phthalocyanine blue untreated bar had an almost blue-black shade, whereas the treated bar had a sky blue color. The treated red iron oxide bar was bright red compared to dull red in the control.

EXAMPLE II

Test bars similar to those in Example I were made from the resin of Example I using iron oxide, phthalocyanine blue, titanium dioxide, chrome green, phthalocyanine green, cadmium yellow, cadmium orange, at the same 5% by weight concentration. Bars of unpigmented, glass-filled resin were also made using molding conditions as in Example I.

The bars were immersed in sufficient water to cover one-half of their length using appropriately sized beakers. The water was brought to the boiling point (100° C.) and the test pieces were treated for 30 minutes.

The results at this higher temperature and shorter time of treatment were the same as in Example I. The treated halves of the bars had brilliant coloration while the untreated sections were dull and much darker. The unpigmented bars were much lighter in color on the ends which had been treated in the boiling water.

EXAMPLE III

Additional runs were carried out in accordance with the procedure of Example I except that different mold temperatures were employed. Substantially no improvement in color was observed when the mold temperature was above 250° F. (121.1° C.). The improvement was not consistent at mold temperatures of 200° to 250° F. (93.3° to 121.1° C.). At mold temperatures below about 200° F. (93.3° C.), a definite improvement was observed.

While this invention has been described in conjunction with presently preferred embodiments, it obviously is not limited thereto.

What is claimed is:

1. In a method of molding an article from a poly(arylene sulfide) resin; the improvement which comprises incorporating a pigment in the resin and molding an article from the resulting resin at a mold temperature below about 200°F. and thereafter treating the molded article with water at a temperature of at least about 180°F. for a period of time sufficient to reduce darkening of the article.

2. The method of claim 1 wherein said pigment is present in an amount within the range of 0.5 to 12 weight percent and the treating step is carried out for at least 20 minutes.

3. The method of claim 1 wherein the article is treated with boiling water.

4. The method of claim 1 wherein the article is treated with steam.

5. The method of claim 1 wherein the resin has a filler incorporated therein.

6. The method of claim 5 wherein the filler comprises glass fibers.

7. A molded article formed from a poly(arylene sulfide) resin having a pigment incorporated therein, said article having been molded at a mold temperature below about 200°F. and thereafter treated with water at a temperature of at least about 180°F.

* * * * *